United States Patent [19]

Martin et al.

[11] Patent Number: 5,236,751

[45] Date of Patent: Aug. 17, 1993

[54] CONE COLLARS WITH TEMPORARY RELEASE COATING AND METHOD FOR MAKING AND ASSEMBLING SAME

[75] Inventors: David C. Martin, Berlin; Matthew J. Guyer, West Hartford, both of Conn.

[73] Assignee: Reflexite Corporation, New Britain, Conn.

[21] Appl. No.: 676,290

[22] Filed: Mar. 28, 1991

[51] Int. Cl.$^5$ .............................................. A61F 13/02
[52] U.S. Cl. .................................... 428/40; 428/141;
428/156; 428/167; 428/172; 428/246; 428/284;
428/350; 428/352; 428/354; 428/913; 359/537
[58] Field of Search ............... 428/156, 167, 172, 352,
428/40, 99, 120, 141, 246, 284, 350, 354, 913,
409; 404/12, 14, 16, 22; 359/321, 531, 534, 547,
551, 537

[56] References Cited

U.S. PATENT DOCUMENTS

| | | | |
|---|---|---|---|
| 2,771,385 | 11/1956 | Humphner | 154/53 |
| 3,096,202 | 7/1963 | Von Arx | 117/68.5 |
| 4,533,600 | 8/1985 | Coughlan et al. | 428/414 |
| 4,751,108 | 6/1988 | Larimore et al. | 427/171 |
| 4,895,747 | 1/1990 | Birkholz et al. | 428/42 |
| 4,917,926 | 4/1990 | Weinhold et al. | 428/40 |

*Primary Examiner*—Donald J. Loney

[57] ABSTRACT

A relatively flexible retroreflective band for adhesive bonding about a support structure comprises a length of retroreflective sheeting formed into a continuous band with the outer portion of the band including retroreflective formations adapted to retroreflect light rays impinging thereon. An adhesive coating is disposed on the inner surface of the band to bond the band to a support structure, and a water-soluble release coating is superposed on the adhesive coating to prevent substantially contact of the adhesive coating with other surfaces. When it is desired to assemble the band onto a support structure, water is applied to dissolve the release coating and, while the adhesive coating is still wet with water, the band is slid over the support structure to the desired position.

11 Claims, 1 Drawing Sheet

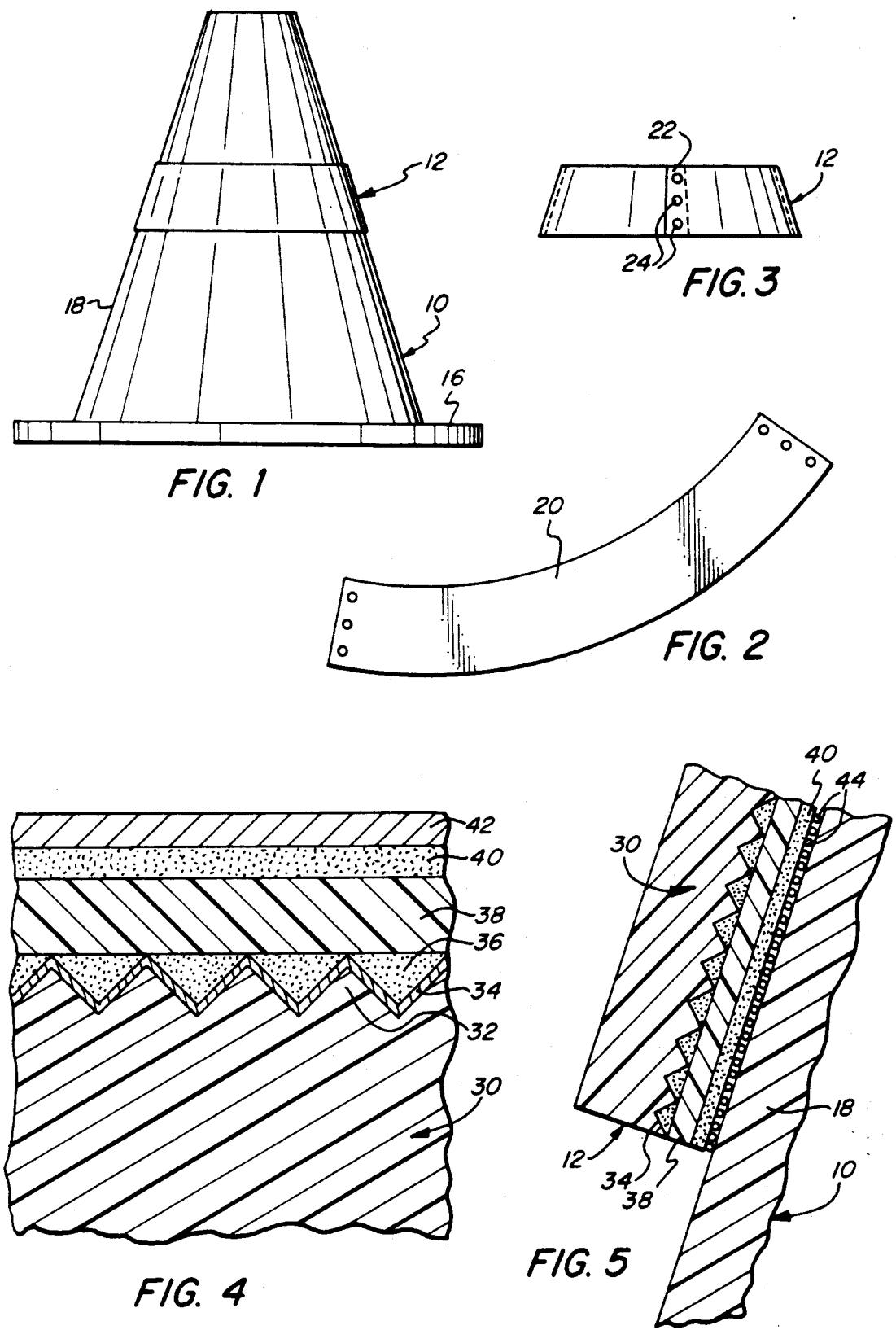

CONE COLLARS WITH TEMPORARY RELEASE COATING AND METHOD FOR MAKING AND ASSEMBLING SAME

BACKGROUND OF THE INVENTION

The present invention relates to reflective bands for adhesively mounting upon various types of support structures, and, more particularly, to a simplified method for making and mounting such bands on support structures and the reflective bands especially adapted therefor.

Retroreflective markers are widely employed in areas of road construction and maintenance and in various other traffic areas where it is desired to alert drivers to potential hazards and to maintain vehicles within a defined travel area. Such retroreflective markers are frequently provided by retroreflective bands which encircle drums or posts, and retroreflective bands having a frustroconical configuration are widely employed on traffic safety cones which are placed along the roadway.

These retroreflective bands are generally formed from lengths of sheet material with overlapping ends which are adhesively bonded or mechanically engaged by rivets, staples or the like. Prior to such assembly, a pressure-sensitive adhesive coating is applied to what will be the inside surface of the band. A release paper or resinous film is desirably applied over the adhesive so that the bands will not stick to themselves or to other structures. In assembling such a band to the support structure, the release paper or film is removed, and the band is fitted over the support structure. Because the pressure sensitive adhesive generally provides a high strength bond and will immediately adhere to any surface with which it comes into contact, placement of a preassembled band onto a support structure represents a substantial problem, particularly during installation in the field. Moreover, removal of the release paper or film from the preformed band is difficult because of the potential of portions of the band adhering to itself.

Coating the preformed band with pressure sensitive adhesive presents a problem from the standpoint of obtaining a good uniform coating and avoiding adhesion of the band to itself. Coating the support structure with the adhesive also presents the potential for misplaced adhesion as the preformed band is slid thereonto.

On the other hand, attempting to form a planar length of the retroreflective material about a support structure without a jig or special equipment presents a similar, and oftentimes greater problem, particularly if the support surface has a substantial taper. If the initial placement is only a little out of line, the band may be skewed substantially or puckered, thus reducing the effectiveness of its reflectivity and materially affecting its appearance.

It is an object of the present invention to provide a novel flexible band of reflective material which may be readily secured in position about a support structure.

It is also an object to provide such a band which is of frustroconical configuration and which may be readily secured in position upon a conical or tapered support.

Another object is to provide a novel method for making such a preformed band of retroreflective material and securing it easily and rapidly upon a support structure.

SUMMARY OF THE INVENTION

It has now been found that the foregoing and related objects may be readily attained in a relatively flexible reflective band for adhesive bonding about a support structure. The retroreflective member is formed into a continuous band with the outer portion of the band including reflective formations adapted to reflect light rays impinging thereon. On the inner surface of the retroreflective band is a pressure-sensitive adhesive coating adapted to bond the band to a support structure, and a water soluble release coating is superposed on the adhesive coating to prevent substantially any contact of the adhesive coating with other surfaces until it is removed.

In the preferred embodiment, the retroreflective member includes a relatively flexible backing element and a retroreflective element bonded thereto, and the backing element has the adhesive coating and release coating thereon. Desirably, the backing element is a fabric, and the band is of frustro-conical configuration with the retroreflective formations being microprisms. The adhesive of the coating is a pressure sensitive tacky adhesive, and the release coating is preferably a water-soluble polymer. Although less desirable, the adhesive may also be a water-activated pressure-sensitive adhesive.

In the method for assembling the bands onto the support structure, an adhesive coating is applied to the back surface of a relatively flexible member having a reflective front surface, and a water soluble release coating is applied over the adhesive coating. The coated member is formed into a closed band with the reflective front surface being disposed outwardly. When ready to be mounted, water is applied to the release coating to effect its removal, and the band is slid onto the support structure to position it in the desired location, at which the adhesive coating bonds the band thereto.

The water applied to the release coating provides a thin layer of water on the adhesive coating to facilitate sliding of the band over the support structure. Water may also be applied to the surface of the support structure to facilitate sliding of the band thereonto.

BRIEF DESCRIPTION OF THE DRAWINGS

FIG. 1 is an elevational view of a traffic cone to which has been applied a reflective band in accordance with the present invention;

FIG. 2 is a plan view of reflective sheeting prior to forming into the frustro-conical configuration of the band of FIG. 1;

FIG. 3 is an elevational view of the band formed by the sheeting of FIG. 2 and employed in FIG. 1;

FIG. 4 is a diagrammatic cross sectional view to a greatly enlarged scale of the reflective sheeting utilized in the band of of FIGS. 1 and 3; and FIG. 5 is a fragmentary and diagrammatic cross sectional view to a greatly enlarged scale showing the band as it is being slid into position on the cone of FIG. 1.

DETAILED DESCRIPTION OF PREFERRED EMBODIMENT OF THE INVENTION

Turning first to FIG. 1, a conventional traffic cone generally designated by the numeral 10 has adhesively bonded about its periphery a frustro-conical band 12 of retroreflective sheeting. Conventionally, such traffic cones 10 are formed from synthetic resin and are provided with an orange coloration so as to make them highly visible, and they are molded with a base 16 for stability and a frustro-conical hollow body 18.

As seen in FIGS. 2 and 3, an arcuate strip 20 of reflective material is formed into a band 12 with overlapping end portions 22 which are secured together by rivets 24. Other means of fastening the overlapping end portions 22 may also be employed such as adhesive bonding and sonic welding.

Turning now to FIG. 4, the sheeting utilized to form the band 12 is therein diagrammatically illustrated as having a retroreflective body generally designated by the numeral 30 having microprisms 32 formed on its rear surface and which are provided with a reflective coating 34. A layer 36 of adhesive bonds to the body 10 a flexible backing 38 which has on its opposite surface a pressure sensitive adhesive coating 40. Superposed on the adhesive coating 40 is a release coating 42 of water soluble material.

Turning now to FIG. 5, the method of assembly utilizing the bands of the present invention is therein illustrated. At such time as the band is to be mounted upon the cone 30, water is applied to the inside surface of the band 12 to remove the water-soluble release coating 42 and thereby expose the pressure sensitive adhesive layer 40. A film of water 44 remains on the surface of the pressure sensitive coating 40 and acts as a lubricant and adhesion preventing element as the band 12 is fitted over the body 18 of the cone 10 and moved downwardly into the desired position. At this point pressure may be applied about the periphery of the band to express any remaining water between the opposed surfaces and firmly bond the band 12 to the cone 10.

In the illustrated structure the reflective formations are closely spaced microprisms or cube corner formations. Details concerning the structure and operation of such microprisms may be found in Rowland U.S. Pat. No. 3,684,348 granted Aug. 15, 1972. These microprisms or cube corner formations may have a side edge dimension of up to 0.025 inch, but the preferred structures use edge dimensions of not more than 0.010 inch, and most desirably on the order of 0.004–0.008 inch.

However, glass bead retroreflective sheeting of the type sold by Minnesota Mining and Manufacturing Company under the trademark SCOTCHLITE may also be employed. Such sheeting is illustrated and described in Palmquist U.S. Pat. No. 2,379,741 and Palmquist et al U.S. Pat. No. 2,407,680.

The reflective sheeting will generally have a total thickness on the order of 0.003–0.012 inch and preferably about 0.004–0.008 inch when a highly flexible laminate is to be formed and depending upon the method of fabrication, the resins, and other characteristics desired for the retroreflective sheeting.

Microprism sheeting may be formed by casting prisms upon a film surface functioning as the body, or by embossing a preformed sheeting, or by casting both body and prisms concurrently. Desirably, the resins employed for the microprism sheeting are cross-linked thermoplastic formulations. Desirably the resin selected provides flexibility, light stability, and good weathering characteristics. In some instances, the front face of the retroreflective sheeting may be provided with a protective coating such as by application of a lacquer or other coating material. Suitable resins for the retroreflective sheeting include vinyl chloride polymers, polyesters, polycarbonates, methyl methacrylate polymers, polyurethanes and acrylated urethanes.

Another method for fabricating such microprism sheeting is shown in Rowland U.S. Pat. No. 4,244,683 granted Jan. 13, 1981 in which the cube corner formations are produced by embossing a length of sheeting in suitable embossing apparatus with precisely formed molds in a manner which avoids entrapment of air.

The latter method has been used for forming sheeting of acrylic and polycarbonate resins while the former method has proven highly advantageous for forming retroreflective sheeting from polyvinyl chloride resins and, more recently, polyester body members with prisms of various resin formulations including acrylated epoxy oligomers.

Typically, glass microspheres are embedded in a reflective matrix or otherwise provided with a reflective coating on the surface diametrically spaced from the entry surface for the light rays in order to retroreflect such rays.

As is known, the reflective interface for the preferred microprisms may be provided by either a reflective coating or by an air interface. In the usual embodiment of the present invention, a reflective coating is provided upon the surfaces of the microprisms, and such reflective coatings have most commonly been vacuum metallized aluminum deposits, although metallic lacquers and other specular coating materials have also been used.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

A retroreflective material utilizing some prisms which have air interfaces and others which utilize reflective coatings offer some advantages and is described in detail in Martin U.S. Pat. No. 4,801,193 granted Jan. 31, 1989.

It is customary to provide a flexible backing sheet behind the reflective sheeting so as to strengthen and protect it and to provide a smooth surface for application of the structure to support surfaces. To effect lamination of such a backing sheet to the reflective sheeting, adhesives and ultrasonic welding have generally been employed.

If so desired, retroreflective sheeting may be produced by applying the backing material to a partially metallized material so as to maintain the air interface in the uncoated areas.

The backing sheet may be a woven or laid fabric, or a flexible, durable polymeric material. Suitable resins include polyethylene, polypropylene, polyurethanes, acrylated polyurethanes and ethylene/vinyl acetate copolymers. Polyester, nylon, and urethane fabrics may be employed as well as those of natural fibers such as cotton.

Conveniently, a pressure sensitive adhesive is used to laminate the backing material to the reflective material. Preferred adhesives include rubber based systems such as isobutylene in a solvent carrier and acrylic-based adhesives and silicones in solvent systems. Other adhesives may also be employed, and water-based systems may also be used although sometimes requiring longer drying time before further processing. Specific examples of suitable adhesive systems are an acrylic adhesive sold by Coating Science under the designation CSI UP 309; a rubber based, resin modified adhesive sold by B.F. Goodrich under the designation A1569-B; a latex rubber-based adhesive sold by Emhart Industries, Bostik Division, under the designation 8786X; a latex rubber-based system sold by B. F. Goodrich under the designation 26171; and a pressure sensitive silicone resin adhesive in a solvent sold by Dow under the designation QZ-7406. The thickness of this coating will be on the order of 0.002-0.007 inch.

Whether using solvent-based or water based systems, the coating will normally require drying before further processing. If so, heating may be utilized to accelerate the process.

The step of adhering the backing to the retroreflective sheeting may simply involve passing the adhesively coated retroreflective sheeting through the nip of a pair of rolls together with the backing material to apply the necessary pressure to effect adhesion. If a heat-activatable adhesive is employed, the retroreflective sheeting may be subjected to preheating prior to passage through the rolls, or the rolls may be heated to achieve the necessary activation. However, it is also possible to employ ultrasonic welding and other techniques to bond the backing material to the retroreflective sheeting by the material of the backing material itself when it is thermoplastic.

The adhesive coating for bonding the band to the support structure may be one pre-applied to the backing material or applied thereto after lamination to the reflective material. Conveniently, pre-coated backing material having a release film thereon is utilized, and the release film is subsequently removed. Although this coating may employ the same pressure sensitive adhesives, different characteristics may be required such as plasticizer resistance when the band is to be placed upon support structures molded from polyvinyl chloride. Although less desirable, it may be possible to use a water-activated adhesive which would be activated upon removal of the release coating. The thickness of this adhesive coating will normally be on the order of 0.002-0.007 inch.

To keep the adhesive coating from premature adhesion, the water-soluble release coating is applied thereon. Among the substances which may be utilized to provide such a water-soluble coating are hydroypropyl cellulose, polyvinyl pyrrolidone, methyl cellulose, polyvinyl alcohol/acetate copolymer, soaps such as glycerol stearate, and detergents. The resin or other agent is applied as a solution or dispersion in organic solvent, water, or mixtures thereof, and the coating is dried to a tack-free condition in air or by application of heat.

To provide a coloration to the retroreflected light at night, a dye may be incorporated in the resin used to form the reflective member or a portion thereof. As an alternative to a dye and as an effective necessity in some resin systems, the coloration may be provided as a finely divided pigment which is well dispersed; however, some loss in retroreflectivity will occur as the result of refraction by pigment particles which are directly in the path of light rays.

The release coating material may be applied to the surface of the adhesive coating by any suitable apparatus including gravure rolls, sprayers, brushes, etc. Generally, the coating agent will be incorporated in a solution or dispersion containing a relative volatile solvent or solvent mixture so that the solvent or dispersing medium may be readily evaporated when the coated material is passed through a drying tunnel or the like prior to rolling into a coil for further processing. Once the release agent coating has dried, it has been found that the material may be coiled and stored for extended periods of time in humid and relatively warm atmospheres without bonding between adjacent layers.

Depending upon the application, the coated material may be readily wide sheeting which is subsequently slit to the desired width before or after coiling. When it is desired to fabricate the bands, blanks of the desired dimension are cut from the sheeting, conveniently by die cutting or the like. The cut blanks are formed into continuous bands with overlapping ends which are conveniently secured in assembly. This may be effected by self piercing rivets, staples or the like, or by a separate coating of adhesive, or by activating the adhesive coating which has been previously applied through abrading or washing off a portion of the release coating, or by sonic welding or any other suitable techniques. However, a separate bonding element may be used to bond the edges of the strip material which are butted together.

When it is desired to assemble the band onto a support structure, the release coating may be readily removed either by immersion in water or by spraying water onto the coated surface. While there is still water on the surface of the adhesive coating, the band is quickly slipped onto the support structure and slid down along the surface to the desired position. At that point, pressure applied to the outer surface of the band will express any remaining water from the interface between the band and the support structure and bond the band to the support structure. In some instances, it may be desirable to apply water to the surface of the support structure to provide some additional lubricity to facilitate the rapid and adhesion free movement of the band into the desired position thereon.

Although the invention has been shown as applicable to reflective traffic cones, the bands may also be used with barrels, posts and other structures which utilize a reflective band about their periphery.

Illustrative of the present invention is the following example.

EXAMPLE ONE

Utilizing the method generally illustrated in Rowland U.S. Pat. No. 3,689,346, microprisms having a height of 0.0028 inch and a spacing of about 0.006 inch on center are cast upon a polyester film having a thickness of 0.0002 inch, and coated with a tie coat of a solution of polyester resin. The thin polyester film is temporarily bonded to a carrier of surface treated polyester film having a thickness of 0.002 inch by a silicone adhesive. The resin employed for casting the prisms is an acrylated epoxy oligomer modified with monofunctional and trifunctional acrylic monomers and containing a cross linking catalyst.

The retroreflective sheeting is vacuum metallized with aluminum to a thickness in excess of 240 Angstroms. The metallized sheeting is coated with 0.003 inch of a pressure sensitive, ever-tacky acrylic adhesive sold by Coating Science under the designation CSI UP 309.

The coated sheet material is then passed through the nip of laminating rollers together with a woven polyester fabric having a thickness of about 0.006 inch to effect the lamination thereto. On its opposite surface the fabric has a coating of 0.004 inch of a plasticizer resistant acrylic adhesive sold by Coating Science under the designation UV 405 with a release film thereover.

Thereafter, the release film is stripped from the laminiate as a solution of the water-soluble release agent is applied. The solution contains 14.5 percent water, 75 percent isopropanol, 10 percent hydroxypropyl cellulose sold under the designation Klucel E, and 0.5 percent of a surface active agent sold by GAF Corp. under the designation Alepal CO-433. This coating has a thickness of about 0.0005–0.002 inch, and is dried in an oven prior to coiling of the coated laminate.

Subsequently, a series of arcuate blanks are cut from the laminate and these are formed into frustroconical bands or cone collars with overlapping ends which are secured in assembly by self piercing rivets. The cone collars thus formed, are stacked and stored. No evidence of any adhesion is observed after extended storage.

Subsequently, the cone collars are immersed in water to dissolve the release coating and, while still wet, are slid onto polyvinyl chloride cones to the desired position without premature adhesion. Pressure is applied to the collars to firmly bond them to the cones.

Thus, it can be seen from the foregoing detailed specification and the attached drawings that the method of the present invention produces a reflective band which is highly flexible and which may be readily secured to support structures such as traffic cones and barrels. The bands may be readily fabricated, are relatively durable, and may be made, stacked and stored in hot and humid atmospheres. The process of assembly to the support structure is simple, rapid and trouble-free.

Having thus described the invention, what is claimed is:

1. A relatively flexible retroreflective band for adhesive bonding about a support structure comprising:
   (a) a retroreflective member formed into a continuous band with the outer portion of, said band including retroreflective formations which retroreflect light rays impinging thereon;
   (b) an adhesive coating on the inner surface of said retroreflective member adapted to bond said band to a support structure; and
   (c) a water soluble release coating superposed on said adhesive coating to prevent substantially contact of said adhesive coating with other surfaces.

2. The retroreflective band in accordance with claim 1 wherein said retroreflective member includes a relatively flexible backing element and a retroreflective element bonded thereto, said backing element having said adhesive coating and release coating thereon.

3. The retroreflective band in accordance with claim 2 wherein said backing element is a fabric.

4. The retroreflective band in accordance with claim 1 wherein said adhesive of said coating is a pressure sensitive adhesive.

5. The retroreflective band in accordance with claim 1 wherein said adhesive of said coating is a water-activated adhesive.

6. The retroreflective band in accordance with claim 1 wherein said retroreflective formations are microprisms.

7. The retroreflective band in accordance with claim 1 wherein said release coating is of a water-soluble polymer.

8. The retroreflective band in accordance with claim 1 wherein said band is of frustro-conical configuration.

9. A relatively flexible retroreflective band for adhesive bonding about a support structure comprising:
   (a) a retroreflective member formed into a continuous band with the outer portion of said band including retroreflective formations which retroreflect light rays impinging thereon, said member including a relatively flexible backing element and a retroreflective element bonded to one surface thereof;
   (b) a pressure sensitive adhesive coating on the opposite surface of said backing element adapted to bond said band to a support structure; and
   (c) a water-soluble polymer release coating superposed on said adhesive coating to prevent substantially contact of said adhesive coating with other surfaces.

10. The retroreflective band in accordance with claim 9 wherein said backing element is a fabric.

11. The retroreflective band in accordance with claim 9 wherein said band is of frustro-conical configuration.

* * * * *